United States Patent
Boss et al.

(10) Patent No.: US 10,978,061 B2
(45) Date of Patent: Apr. 13, 2021

(54) VOICE COMMAND PROCESSING WITHOUT A WAKE WORD

(71) Applicant: International Business Machines Corporation, Armonk, NY (US)

(72) Inventors: Gregory J. Boss, Saginaw, MI (US); Jeremy R. Fox, Georgetown, TX (US); Andrew R. Jones, Round Rock, TX (US); John E. Moore, Jr., Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 15/916,413

(22) Filed: Mar. 9, 2018

(65) Prior Publication Data

US 2019/0279624 A1    Sep. 12, 2019

(51) Int. Cl.

| | |
|---|---|
| *G10L 15/00* | (2013.01) |
| *G10L 15/22* | (2006.01) |
| *G10L 15/24* | (2013.01) |
| *G10L 15/20* | (2006.01) |
| *G06F 3/16* | (2006.01) |
| *G06F 40/20* | (2020.01) |

(52) U.S. Cl.
CPC ............. *G10L 15/22* (2013.01); *G06F 3/167* (2013.01); *G06F 40/20* (2020.01); *G10L 15/20* (2013.01); *G10L 15/24* (2013.01); *G10L 2015/223* (2013.01)

(58) Field of Classification Search
None
See application file for complete search history.

(56) References Cited

U.S. PATENT DOCUMENTS

| | | |
|---|---|---|
| 5,899,972 A | 5/1999 | Miyazawa et al. |
| 9,368,105 B1 | 6/2016 | Freed et al. |
| 9,445,209 B2 | 9/2016 | Dadu et al. |
| 9,484,030 B1 | 11/2016 | Meaney et al. |
| 9,747,899 B2 | 8/2017 | Pogue et al. |
| 9,812,128 B2 * | 11/2017 | Mixter .................... G10L 15/22 |
| 2008/0091426 A1 | 4/2008 | Rempel et al. |

(Continued)

FOREIGN PATENT DOCUMENTS

CN          105700372          6/2016

OTHER PUBLICATIONS

Anonymous, "Location-Location based Event handling," IP.com Disclosure No. IPCOM000234960D, published Feb. 19, 2014, 11 pages.

(Continued)

*Primary Examiner* — Seong-Ah A Shin
(74) *Attorney, Agent, or Firm* — Yee & Associates, P.C.

(57) ABSTRACT

A method, a computer system, and a computer program product for detecting voice commands. Audio is recorded by the computer system to form a recorded audio. The computer system then determines whether a voice command spoken by a first person is present in the recorded audio. If the voice command is present in the recorded audio, the computer system determines whether the voice command is directed to a second person by the first person. If the voice command is not being directed to the second person, the computer system processes the voice command, wherein processing of the voice command occurs without a wake word.

15 Claims, 5 Drawing Sheets

(56) References Cited

U.S. PATENT DOCUMENTS

| | | | |
|---|---|---|---|
| 2008/0301135 A1 | 12/2008 | Alves et al. | |
| 2012/0316876 A1* | 12/2012 | Jang | H04N 21/4415 704/246 |
| 2014/0164532 A1* | 6/2014 | Lynch | H04L 12/1818 709/206 |
| 2014/0222436 A1* | 8/2014 | Binder | G10L 21/16 704/275 |
| 2014/0278435 A1 | 9/2014 | Ganong, III et al. | |
| 2017/0070612 A1* | 3/2017 | Li | H04M 1/645 |
| 2017/0169818 A1* | 6/2017 | VanBlon | G10L 15/22 |
| 2017/0262537 A1* | 9/2017 | Harrison | G10L 21/055 |
| 2017/0311261 A1 | 10/2017 | Mozer et al. | |
| 2017/0332168 A1 | 11/2017 | Moghimi et al. | |
| 2018/0061404 A1* | 3/2018 | Devaraj | G10L 15/22 |
| 2019/0036856 A1* | 1/2019 | Bergenlid | H04N 21/4788 |
| 2019/0187787 A1* | 6/2019 | White | G06F 3/013 |
| 2019/0333498 A1* | 10/2019 | Xu | G10L 25/51 |
| 2020/0019373 A1* | 1/2020 | Abramson | G06F 9/453 |

OTHER PUBLICATIONS

Anonymous, "Method and System for Authorization of Online Orders in Personal Assistant Devices using People/Devices Nearby," IP.com Disclosure No. IPCOM000251069D, published Oct. 6, 2017, 2 pages.

Anonymous, "Urgency-Based Optimization for Intelligent Personal Assistants," IP.com Disclosure No. IPCOM000250398D, published Jul. 11, 2017, 4 pages.

Eustice et al., "A universal information appliance," IBM Systems Journal, vol. 38, No. 4, 1999, pp. 575-601.

Stevens, "Amazon's New Echo Device Will Be Watching," Fax Business, published May 11, 2017, accessed Dec. 8, 2017, 2 pages. http://www.foxbusiness.com/features/2017/05/11/amazons-new-echo-device-will-be-watching.html.

Sun et al., "Contextual Intent Tracking for Personal Assistants," Proceedings of the 22nd ACM SIGKDD International Conference on Knowledge Discovery and Data Mining, Aug. 13-17, 2016, San Francisco, California, pp. 273-282.

\* cited by examiner

VOICE COMMAND PROCESSING WITHOUT A WAKE WORD

BACKGROUND

1. Field

The disclosure relates generally to an improved data processing system and, more specifically, to a method, an apparatus, a computer system, and a computer program product for detecting voice commands.

2. Description of the Related Art

Virtual assistance through listening devices is becoming more commonplace in homes. These listening devices are connected to virtual assistants. Typically, the listening devices are always on and listening for a command. Many homes have one or more listening devices that are of close enough proximity to hear commands that may be intended for a different device or person. Currently, this situation is handled through the use of a wake word that is detected by a virtual assistant through a listening device. The wake word involves a person speaking a word or phrase that activates the virtual assistant. The virtual assistant is always listening through the listening device to detect whether the person has spoken the wake word. When the wake word is detected, the virtual assistant processes the audio input and generates a response.

The use of the wake word, however, increases processing time and use of processing resources. Further, the use of the wake word also results in an interaction that is less seamless than desired. Using a wake word also results in the experience being less like a conversation with a person.

Therefore, it would be desirable to have a method, an apparatus, a computer system, and a computer program product that take into account at least some of the issues discussed above, as well as other possible issues. For example, it would be desirable to have a method, an apparatus, a computer system, and a computer program product that overcome a technical problem with requiring the use of wake words to process voice commands.

SUMMARY

According to one illustrative embodiment, a method for detecting voice commands is provided. A computer system records audio to form a recorded audio. The computer system then determines whether a voice command spoken by a first person is present in the recorded audio. If the voice command is present in the recorded audio, the computer system determines whether the voice command is directed to a second person by the first person. If the voice command is not directed to the second person, the computer system processes the voice command, wherein the processing of the voice command occurs without a wake word.

According to another illustrative embodiment, a computer system for detecting voice commands is provided. The computer system is comprised of a bus system, a storage device connected to the bus system, and a processor unit connected to the bus system. The storage device stores program instructions. The processor unit processes the program instructions to record audio to form a recorded audio; determines whether the voice command is directed to a second person by the first person in response to the voice command being present in the recorded audio; and processes the voice command in response to the voice command not being directed to the second person, wherein the processing of the voice command occurs without a wake word.

According to yet another illustrative embodiment, a computer program product for managing voice commands is provided. The computer program product is comprised of a computer-readable storage media and first program code, stored on the computer-readable storage media, for recording audio to form a recorded audio. Second program code is stored on the computer-readable storage media for determining whether a voice command spoken by a first person is present in the recorded audio. Third program code is stored on the computer-readable storage media for determining whether the voice command is directed to a second person by the first person in response to the voice command being present in the recorded audio. Fourth program code is stored on the computer-readable storage media for processing the voice command in response to the voice command not being directed to the second person, wherein the processing of the voice command occurs without a wake word.

DETAILED DESCRIPTION

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, a special purpose computer, or some other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account one or more different considerations. For example, the illustrative embodiments recognize and take into account that it would be desirable to determine when a voice command is directed towards a virtual assistant without using a wake word. The illustrative embodiments recognize and take into account that it would be desirable to avoid the current requirement of using a wake word detected by a virtual assistant through a listening device to activate the virtual assistant.

Thus, the illustrative examples provide a method, an apparatus, a computer system, and a computer program product for detecting voice commands that are to be processed by a virtual assistant connected to a listening device. In one illustrative example, a computer system records audio to form a recorded audio. The computer system determines whether a voice command spoken by a first person is present in the recorded audio. Responsive to the voice command being present in the recorded audio, the computer system determines whether the voice command is directed to a second person by the first person. Responsive to the voice command not being directed to the second person, the computer system processes the voice command, wherein processing of the voice command occurs without a wake word.

Figure 1:
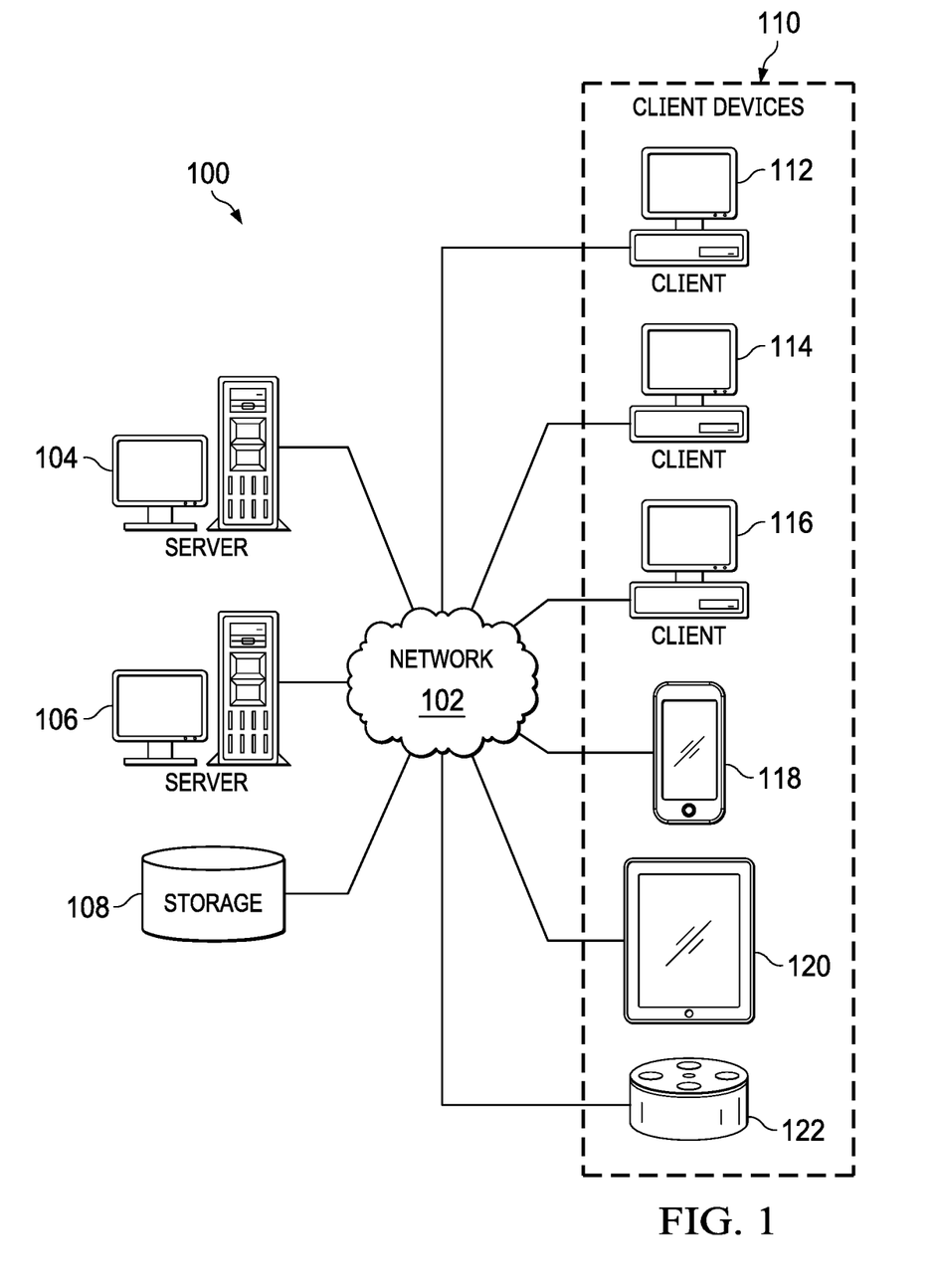
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wires, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices, such as mobile phone 118, tablet computer 120, and smart speaker 122. In this illustrative example, some or all of client devices 110 may form an Internet of things (IOT) in which these physical devices can connect and exchange data. One or more of these clients, such as smart speaker 122, can provide access to virtual assistants in the illustrative examples.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer recordable storage medium and downloaded to a data processing system or other device for use. For example, program code may be stored on a computer recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example and not as an architectural limitation for the different illustrative embodiments.

As used herein, "a number of," when used with reference items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

The illustration of network data processing system 100 in FIG. 1 is not meant to limit the manner in which other network data processing systems can be implemented. For example, network data processing systems can include other numbers of server computers. Further, other components such as routers, proxy servers, firewalls, and other devices are present but not shown in network data processing system 100.

Figure 2:
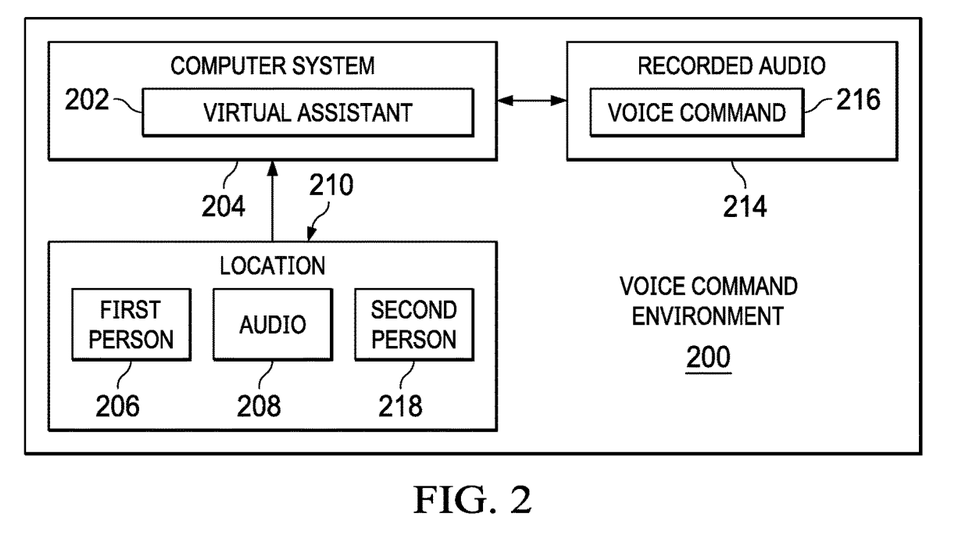
FIG. 2 is a block diagram of a voice command environment in accordance with an illustrative embodiment.

With reference now to FIG. 2, a block diagram of a voice command environment is depicted in accordance with an illustrative embodiment. As depicted, voice command environment 200 is an environment in which virtual assistant 202 running on computer system 204 can interact with first person 206. Voice command environment 200, including computer system 204, can be implemented using the hardware depicted in network data processing system 100 in FIG. 1.

In this illustrative example, computer system 204 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet computer, a mobile phone, a smart speaker, or some other suitable data processing system. In one illustrative example, computer system 204 may include server computer 104, client computer 112, and smart speaker 122 shown in block form in FIG. 1, or other suitable data processing systems in network data processing system 100 in FIG. 1. In another illustrative example, computer system 204 may be server computer 106 shown in block form in FIG. 1.

Virtual assistant 202 runs on computer system 204 and is configured to interact with a person using a voice interface. Virtual assistant 202 can be implemented in hardware, software, or some combination thereof. In one illustrative example, virtual assistant 202 on computer system 204 may be a cloud-based voice service that uses speech recognition processes.

Virtual assistant 202 can be implemented using one or more artificial intelligence systems. Virtual assistant 202 can take the form of Alexa, IBM Watson, Google Assistant, or some other suitable type of virtual assistant. A virtual assistant can also be referred to as an intelligent personal assistant. Alexa is available from Amazon.com, Inc. and is a trademark of Amazon.com, Inc. IBM Watson is available from International Business Machines Corporation and is a registered trademark of International Business Machines Corporation. Google Assistant is available from Google LLC and "Google" is a registered trademark of Google LLC.

In this illustrative example, first person 206 can verbally interact with virtual assistant 202 in computer system 204 without using a wake word. As depicted, computer system 204 detects audio 208 in location 210 where first person 206 is located.

Location 210 can take a number of different forms. For example, location 210 can be a room, a deck, an office, a house, a conference room, or some other suitable type of location. In this illustrative example, computer system 204 listens for audio 208 continuously. Computer system 204 records audio 208 detected in location 210 to form recorded audio 214.

As depicted, recorded audio 214 is processed by computer system 204 to determine whether voice command 216 spoken by first person 206 is present in recorded audio 214. Responsive to voice command 216 being present in recorded audio 214, computer system 204 can determine whether voice command 216 is directed to second person 218 by first person 206. Responsive to voice command 216 not being directed to second person 218, computer system 204 processes voice command 216. The processing of voice command 216 spoken by first person 206 occurs without a wake word. The processing of voice command 216 is performed by using computer system 204 and virtual assistant 202 in this example.

Figure 3:
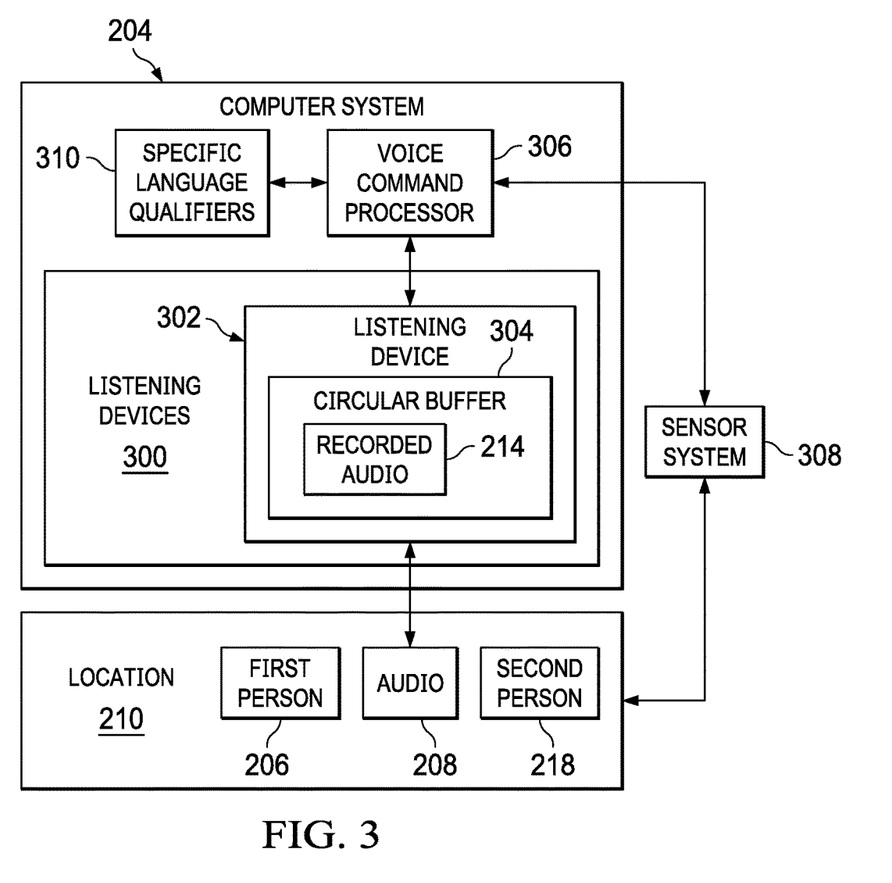
FIG. 3 is a block diagram illustrating processing of a voice command in accordance with an illustrative embodiment.

With reference next to FIG. 3, a block diagram illustrating processing of a voice command is depicted in accordance with an illustrative embodiment. In the illustrative examples, the same reference numeral may be used in more than one figure. This reuse of a reference numeral in different figures represents the same element in the different figures.

In this depicted example, a number of listening devices 300 in computer system 204 is configured for use in location 210. In this illustrative example, audio 208 can be recorded using listening device 302 in the number of listening devices 300 in computer system 204. Listening device 302 is hardware for a voice interface for virtual assistant 202, in this particular example, and can take a number of different forms. For example, listening device 302 can be selected from a group comprising a smart speaker, a mobile phone, a tablet computer, a television, a digital media player, a refrigerator, an internet appliance, or some suitable device or apparatus that includes a voice interface allowing a person to interact with listening device 302.

As depicted, audio 208 can be recorded in circular buffer 304 in listening device 302 by voice command processor 306. In this illustrative example, voice command processor 306 is shown as a functional block. Voice command processor 306 can be implemented in a number of different ways. For example, voice command processor 306 can be located in each of listening devices 300 including listening device 302 to process audio 208 that is recorded by those listening devices. In other illustrative examples, voice command processor 306 may be located in another data processing system and may receive audio 208 from listening devices 300 or access recorded audio 214 stored in listening devices 300. The other data processing system may be, for example, a mobile phone, a tablet computer, a desktop computer, a server computer, or some other suitable type of data processing system.

In still other illustrative examples, voice command processor 306 may be implemented in a distributed manner. In other words, voice command processor 306 may have some functions or components located in listening devices 300 while other components for voice command processor 306 are located in other data processing systems within computer system 204.

As depicted, circular buffer 304 functions as storage for recorded audio 214. Circular buffer 304 can be designed to record a sufficient amount of audio 208 that allows for determining whether a voice command is present and determining whether the voice command is directed towards virtual assistant 202 for second person 218. For example, circular buffer 304 can store two minutes of recorded audio 214 before overwriting recorded audio 214 stored by listening device 302.

In this example, circular buffer 304 is selected as a type of storage to manage continuous recording of audio 208. As audio 208 is recorded, audio 208 can overwrite previously recorded audio in circular buffer 304. Of course, other types of storage mechanisms may be used to temporarily store recorded audio 214 including a first-in-first-out (FIFO) buffer, a data cache, or some other type of storage mechanism.

As depicted in this example, the processing of recorded audio 214 is performed by voice command processor 306. For example, voice command processor 306 can determine whether the voice command identified in recorded audio 214 is directed towards second person 218.

Voice command processor 306 also can determine whether second person 218 is present. For example, voice command processor 306 can determine whether second person 218 is present using sensor system 308. Sensor system 308 can determine whether second person 218 is present in location 210 or can generate sensor information that is used to make the determination. In this illustrative example, sensor system 308 can be selected from at least one of an Internet of things device, a motion sensor, a passive infrared sensor, a thermal sensor, or a video camera. The Internet of things device can be listening device 302 or some other suitable device in communication with listening device 302 in location 210.

In response to determining that second person 218 is present, voice command processor 306 can determine whether voice command 216 is directed to second person 218 by first person 206 by evaluating voice command 216 for a group of specific language qualifiers 310 to determine whether voice command 216 is directed to second person 218. In this example, specific language qualifiers 310 are phrases or words that indicate whether voice command 216 is directed to second person 218. For example, specific language qualifiers 310 are selected from at least one of first person 206 asking a question without referencing anyone, first person 206 issuing a command without referencing anyone, first person 206 asking for an interface with an Internet of things device without referencing anyone, or for some other qualifier indicating that voice command 216 is not directed towards second person 218.

Voice command processor 306 may be implemented in software, hardware, firmware, or a combination thereof. When software is used, the operations performed by voice command processor 306 may be implemented in program code configured to run on hardware, such as a processor unit. When firmware is used, the operations performed by voice command processor 306 may be implemented in program code and data and stored in persistent memory to run on a processor unit. When hardware is employed, the hardware may include circuits that operate to perform the operations in voice command processor 306.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In one illustrative example, one or more technical solutions are present that overcome a technical problem with requiring the use of a wake word to process voice commands. As a result, one or more technical solutions may provide a technical effect of waking a virtual assistant connected to a listening device that is always listening to process a command without a requiring a wake word. One or more technical solutions enable determining when a voice command is directed to a virtual assistant rather than another person without a wake word. As a result, a more seamless interaction occurs when a wake word is not required. In this manner, the person may interact with the virtual assistant through the listening device in a more conversational manner that the person is accustomed to when interacting with people.

As a result, computer system 204 operates as a special purpose computer system in which voice command processor 306 in computer system 204 enables processing voice commands without the need for wake words to determine when the voice commands are directed towards virtual assistant 202. In particular, voice command processor 306 transforms computer system 204 into a special purpose computer system that recognizes voice commands without wake words as compared to currently available general computer systems that do not have voice command processor 306.

The illustration of voice command environment 200 and the different components in this environment depicted in FIG. 2 and FIG. 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, voice command processor 306 can be located in another data processing system in computer system 204 other than listening device 302. In other illustrative examples, voice command processor 306 can be a distributor component in which a portion of voice command processor 306 is located in listening device 302 in computer system 204 and one or more other portions of voice command processor 306 are located in other data processing systems in computer system 204.

Further, although the different illustrative examples are directed towards processing voice commands without a wake word, virtual assistant 202 is not precluded from responding to wake words detected through listening devices 300. Further, another illustrative example can implement the processing of audio to determine whether voice command 216 is directed towards second person 218 or virtual assistant 202 even when a wake word is used. With this example, the processing of audio may be performed to reduce incorrect responses when voice command 216 is actually directed towards second person 218 instead of virtual assistant 202 even when a wake word is inadvertently used by first person 206.

Figure 4:
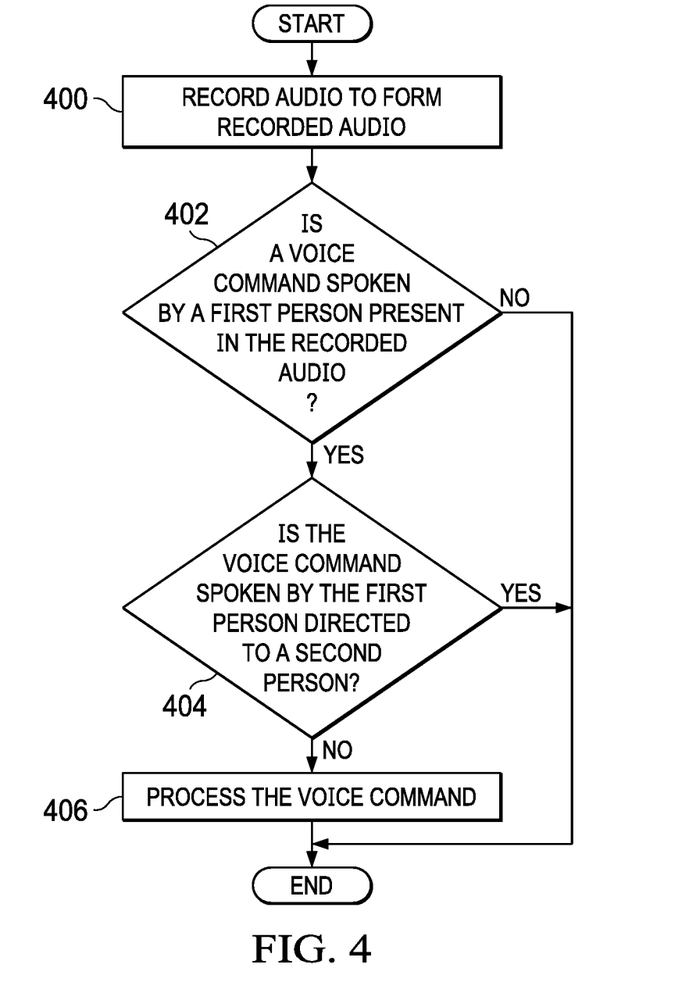
FIG. 4 is a flowchart of a process for detecting voice commands in accordance with an illustrative embodiment.

Turning next to FIG. 4, a flowchart of a process for detecting voice commands is depicted in accordance with an illustrative embodiment. The flowchart in FIG. 4 can be implemented in computer system 204 in FIG. 2. The different steps can be implemented in a component, such as voice command processor 306 in computer system 204 in FIG. 3. The steps can be implemented in hardware, software, or some combination thereof. When implemented in software, the different steps can be implemented in program code in which instructions in the program code are run on a processor unit to perform the different steps in the flowchart.

The process begins by recording audio to form recorded audio (step 400). In step 400, a listening device can be always listening and recording audio in a location to generate the recorded audio for processing.

The process determines whether a voice command spoken by a first person is present in the recorded audio (step 402). In step 402, the process can perform speech recognition such as a voice-to-text conversion. The voice-to-text conversion can be made using any currently available speech recognition system. The voice-to-text conversion can be made using a hidden Markov model, a neural network, or some other suitable artificial intelligence or speech recognition. With the text, a comparison can be made in step 402 with queries or keywords for queries to determine whether a command is present. The comparison can be made using an artificial intelligence system, a neural network, a question-answering system, a natural language processing system, a fuzzy logic system, or some other suitable system for determining whether a command is present.

If the voice command spoken by the first person is present in the recorded audio, the process determines whether the voice command spoken by the first person is directed to a second person (step 404). In determining whether the voice command is being directed to a second person, the process can perform a number of different evaluations. For example, the process can determine whether the audio indicates that the first person is talking to the second person using a name of the person. Additionally, the process can determine whether the audio indicates that questions, commands, or other statements are being made without reference to a pronoun or the name of the person.

Further, this determination can be personalized for a particular person. For example, the process can use machine learning or other artificial intelligence processes to learn idiosyncrasies or other habits of the person to determine whether the voice command is directed to another person. For example, the process can employ machine learning to learn that a particular person always generates voice commands that are not directed towards another person in a particular location. For example, the person may always change the channel, play music, ask about the weather, or generate other voice commands when that person is located on a deck outside of the house.

If the voice command is not directed to the second person, the process processes the voice command (step 406). In step 406, the voice command can be processed by sending the voice command to another component, such as a virtual assistant. In some illustrative examples, the voice command can be processed with the result of the processing being sent to a virtual assistant. The process terminates thereafter. Thus, the illustrative example enables processing of the voice command without a wake word.

With reference again to step 402, if a voice command spoken by the first person is not present in the recorded audio, the process terminates. The process also terminates in step 404 if the voice command spoken by the first person is directed to the second person.

Figure 5:
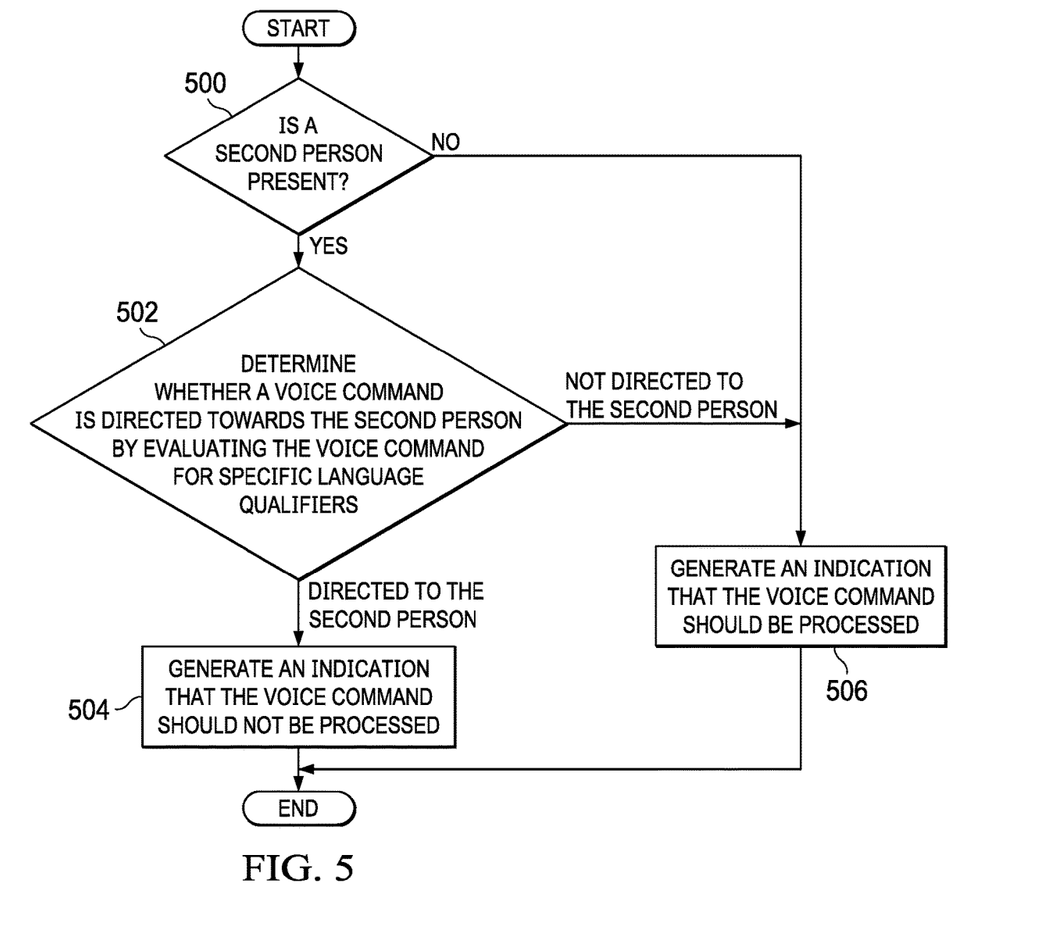
FIG. 5 is a flowchart of a process for determining whether a voice command is directed to a second person in accordance with an illustrative embodiment.

With reference now to FIG. 5, a flowchart of a process for determining whether a voice command is directed to a second person is depicted in accordance with an illustrative embodiment. The process in FIG. 5 is an example of one implementation for step 404 in FIG. 4.

The process begins by determining whether a second person is present (step 500). In this example, step 500 determines whether a second person is present in a location with the first person speaking the voice command. The location can be a room or other location where the first person may speak to the second person. This determination can be made using a sensor system. The sensor system can detect the presence of the second person using sensors selected from at least one of a motion sensor, a passive infrared sensor, a thermal sensor, a video camera, or other suitable types of sensors to obtain sensor information that can be used to determine whether the second person is present in addition to the first person being present in the location.

For example, a motion sensor can detect motion in a manner that differentiates between one person or two or more people moving in a location. A passive infrared sensor can be used to detect human motion, and a thermal sensor can be used to detect the presence of one or more stationary people through the detection of body heat. A video camera monitors a specific location and generates images that can be analyzed to determine whether more than one person is present in a location. Further, Internet of things devices, a mobile phone for the second person, or other devices can be used to determine whether the second person is present in the location.

If a second person is present, the process determines whether a voice command is directed towards the second person by evaluating the voice command for specific language qualifiers (step 502). The specific language qualifiers can be selected from at least one of the first person asking a question without referencing anyone, the first person issuing a command without referencing anyone, the first person asking for an interface with an Internet of things device without referencing anyone, or any other phrase that may be used to indicate that a second person is present.

If a determination is made that the voice command is directed to the second person, an indication is generated that the voice command should not be processed (step 504). The process terminates thereafter. With reference again to step 502, if a determination is made that the voice command is not directed to the second person, the process generates an indication that the voice command should be processed (operation 506), with the process terminating thereafter. With reference again to step 500, if the second person is not present, the process proceeds to step 506.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 6:
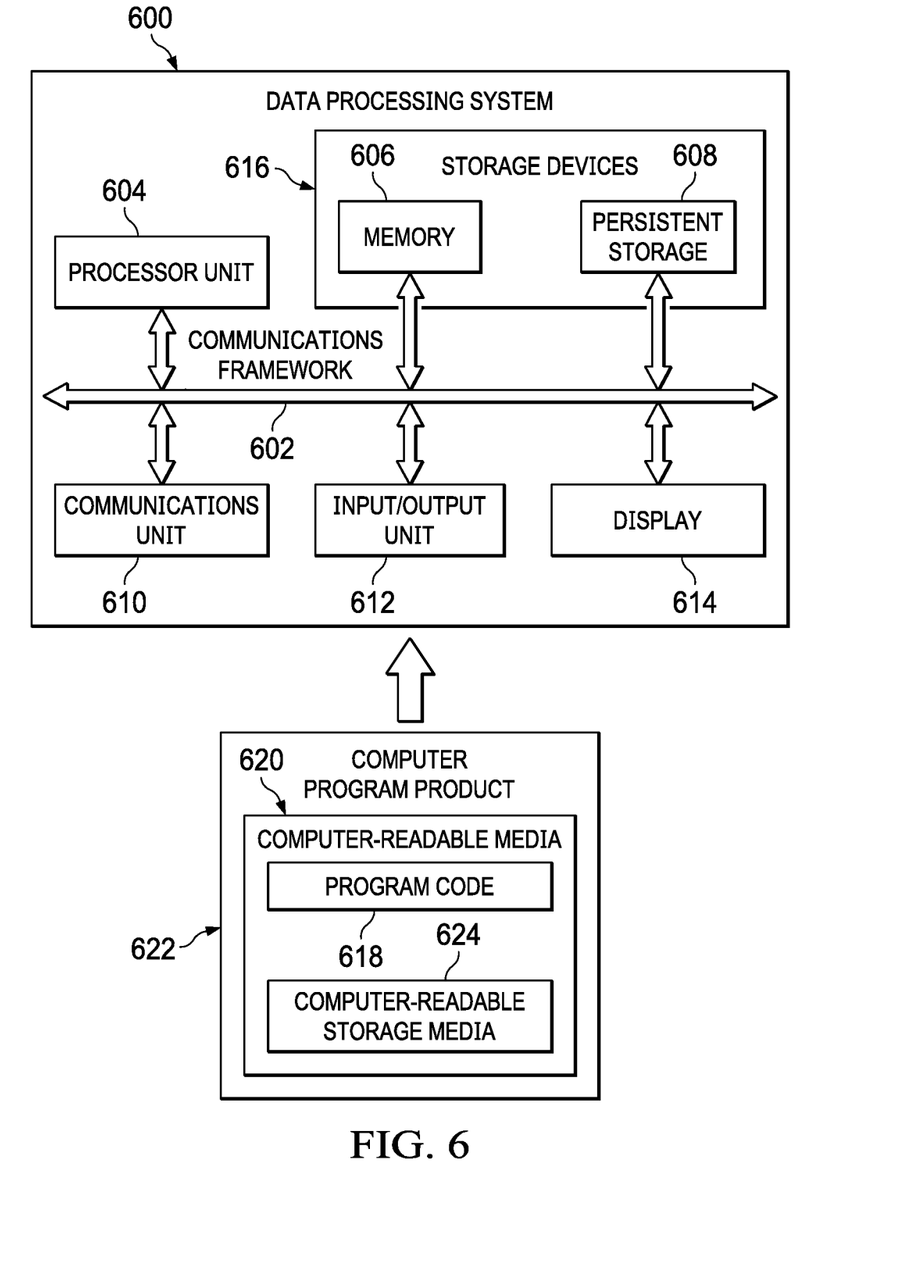
FIG. 6 is a block diagram of a data processing system in accordance with an illustrative embodiment.

Turning now to FIG. 6, a block diagram of a data processing system is depicted in accordance with an illustrative embodiment. Data processing system 600 may be used to implement server computer 104 in FIG. 1, server computer 106 in FIG. 1, client devices 110 in FIG. 1, one or more data processing systems in computer system 204 in FIG. 2, or listening devices 300 in FIG. 3. In this illustrative example, data processing system 600 includes communications framework 602, which provides communications between processor unit 604, memory 606, persistent storage 608, communications unit 610, input/output unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random-access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a solid-state drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these illustrative examples. In the illustrative example, computer-readable media 620 is computer-readable storage media 624. In these illustrative examples, computer-readable storage media 624 is a physical or tangible storage device used to store program code 618 rather than a medium that propagates or transmits program code 618.

Alternatively, program code 618 may be transferred to data processing system 600 using a computer-readable signal media. The computer-readable signal media may be, for example, a propagated data signal containing program code 618. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

Thus, the illustrative embodiments of the present invention provide a computer implemented method, apparatus, computer system, and computer program product for detecting voice commands without wake words. In one illustrative example, a computer system records audio. The computer system determines whether a voice command spoken by a first person is present in the recorded audio. Responsive to the voice command being present in the recorded audio, the computer system determines whether the voice command is directed to a second person by the first person. Responsive to the voice command not being directed to the second person, the computer system processes the voice command, wherein processing of the voice command occurs without a wake word.

Thus, one or more of the illustrative examples provide one or more technical solutions in which the use of a wake word directed to a virtual assistant through a listening device is eliminated. In this manner, one or more technical solutions provide an ability to process voice commands from a person without a formal summoning of the virtual assistant using a wake word. As a result, a more seamless interaction occurs when a wake word is not required. In this manner, the person may interact with the virtual assistant through the listening device in a more conversational manner that the person is accustomed to when interacting with people.

Consequently, the illustrative examples provide an ability to identify voice commands and distinguish whether the voice commands are directed towards a virtual assistant or another person. One or more technical solutions provide a process that can identify a voice command from a first person and distinguish between the first person directing the voice command to a virtual assistant versus the voice command being part of normal conversational language with a second person. Further, an illustrative example can be implemented to process voice commands even when a wake word is present. The illustrative example can be implemented to reduce false processing when the first person is directing the voice command to the second person and uses a wake word without intending the virtual assistant to respond.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for detecting voice commands, the method comprising:
    recording, by a computer system, audio to form a recorded audio;
    converting, by the computer system, the recorded audio to text using voice-to-text conversion;
    performing, by the computer system, a comparison of the text of the voice-to-text conversion to keywords for queries using fuzzy logic to determine whether a voice command is spoken by a first person in the recorded audio;
    identifying, by the computer system, the voice command spoken by the first person in the recorded audio based on the comparison;
    determining, by the computer system, whether the voice command spoken by the first person is directed to a virtual assistant without using a wake word to activate the virtual assistant and not to a second person by evaluating the voice command for specific language qualifiers indicative of the voice command not referencing the second person; and
    responsive to the voice command not referencing the second person, processing, by the computer system, the voice command using the virtual assistant without the wake word.

2. The method of claim 1, wherein the specific language qualifiers are selected from at least one of the first person asking a question without referencing anyone, the first person issuing the voice command without referencing anyone, or the first person asking for an interface with an Internet of things device without referencing anyone.

3. The method of claim 1, wherein recording, by the computer system, the audio to form the recorded audio comprises:
    recording, by the computer system, the audio in a circular buffer.

4. The method of claim 1, wherein recording, by the computer system, the audio to form the recorded audio comprises:
recording the audio to form the recorded audio using a listening device in the computer system.

5. The method of claim 4, wherein the listening device is selected from a group comprising a smart speaker, a mobile phone, a tablet computer, a television, a digital media player, a refrigerator, and an Internet appliance.

6. A computer system for detecting voice commands, the computer system comprising:
a bus system;
a storage device connected to the bus system, wherein the storage device stores program instructions; and
a processor unit connected to the bus system, wherein the processor unit processes the program instructions to record audio to form a recorded audio; convert the recorded audio to text using voice-to-text conversion;
perform a comparison of the text of the voice-to-text conversion to keywords for queries using fuzzy logic to determine whether a voice command is spoken by a first person in the recorded audio;
identify the voice command spoken by the first person in the recorded audio based on the comparison;
determine whether the voice command spoken by the first person is directed to a virtual assistant without using a wake word to activate the virtual assistant and not to a second person by evaluating the voice command for specific language qualifiers indicative of the voice command not referencing the second person; and
process the voice command using the virtual assistant without the wake word in response to the voice command not referencing the second person.

7. The computer system of claim 6, wherein the specific language qualifiers are selected from at least one of the first person asking a question without referencing anyone, the first person issuing the voice command without referencing anyone, or the first person asking for an interface with an Internet of things device without referencing anyone.

8. The computer system of claim 6, wherein in processing the program instructions to record the audio to form the recorded audio, the processor unit processes the program instructions to record the audio in a circular buffer.

9. The computer system of claim 6, wherein in processing the program instructions to record the audio to form the recorded audio, the processor unit processes the program instructions to record the audio to form the recorded audio using a listening device in the computer system.

10. The computer system of claim 9, wherein the listening device is selected from a group comprising a smart speaker, a mobile phone, a tablet computer, a television, a digital media player, a refrigerator, and an Internet appliance.

11. A computer program product for managing voice commands, the computer program product comprising a non-transitory computer-readable storage media with program code stored thereon that, when executed by a processor, performs steps of:
recording audio to form a recorded audio;
converting the recorded audio to text using voice-to-text conversion;
performing a comparison of the text of the voice-to-text conversion to keywords for queries using fuzzy logic to determine whether a voice command is spoken by a first person in the recorded audio;
identifying the voice command spoken by the first person in the recorded audio based on the comparison;
determining whether the voice command spoken by the first person is directed to a virtual assistant without using a wake word to activate the virtual assistant and not to a second person by evaluating the voice command for specific language qualifiers indicative of the voice command not referencing the second person; and
processing process the voice command using the virtual assistant without the wake word in response to the voice command not referencing the second person.

12. The computer program product of claim 11, wherein recording the audio to form the recorded audio comprises:
recording the audio to form the recorded audio in a circular buffer.

13. The computer program product of claim 11, wherein recording the audio to form the recorded audio comprises:
recording the audio to form the recorded audio using a listening device in a computer system.

14. The computer program product of claim 13,
wherein the listening device is selected from a group comprising a smart speaker, a mobile phone, a tablet computer, a television, a digital media player, a refrigerator, and an Internet appliance.

15. The computer program product of claim 11, wherein the specific language qualifiers are selected from at least one of the first person asking a question without referencing anyone, the first person issuing the voice command without referencing anyone, or the first person asking for an interface with an Internet of things device without referencing anyone.

* * * * *